United States Patent
Birder

(10) Patent No.: US 7,120,869 B2
(45) Date of Patent: Oct. 10, 2006

(54) ENHANCED MECHANISM FOR AUTOMATICALLY GENERATING A TRANSFORMATION DOCUMENT

(75) Inventor: Matthew D. Birder, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 623 days.

(21) Appl. No.: 09/932,110

(22) Filed: Aug. 16, 2001

(65) Prior Publication Data

US 2004/0205615 A1 Oct. 14, 2004

(51) Int. Cl.
G06F 15/00 (2006.01)

(52) U.S. Cl. ............... 715/523; 715/500; 715/522

(58) Field of Classification Search ........ 715/522–523, 715/501.1, 513, 500
See application file for complete search history.

(56) References Cited

U.S. PATENT DOCUMENTS

| | | | |
|---|---|---|---|
| 6,263,332 B1 | 7/2001 | Nasr et al. | |
| 6,487,566 B1 * | 11/2002 | Sundaresan | 715/513 |
| 6,748,569 B1 * | 6/2004 | Brooke et al. | 715/523 |
| 2002/0055932 A1 * | 5/2002 | Wheeler et al. | 707/104.1 |
| 2002/0122054 A1 * | 9/2002 | Hind et al. | 345/731 |
| 2002/0123878 A1 * | 9/2002 | Menke | 704/2 |
| 2002/0184525 A1 * | 12/2002 | Cheng | 713/201 |
| 2003/0074181 A1 * | 4/2003 | Gharavy | 704/1 |
| 2003/0149934 A1 * | 8/2003 | Worden | 715/513 |
| 2003/0167445 A1 * | 9/2003 | Su et al. | 715/513 |

* cited by examiner

Primary Examiner—Stephen Hong
Assistant Examiner—Thu V. Huynh
(74) Attorney, Agent, or Firm—Bobby Truong; Hickman Palermo Truong & Becker LLP

(57) ABSTRACT

A transformation document generation mechanism (TDGM) for automatically generating a transformation document given a source document and a target document is disclosed. The TDGM analyzes each document and builds a pattern dictionary for each that records the patterns found in that document. Thereafter, the TDGM processes the pattern dictionaries to automatically generate the transformation document. In doing so, the TDGM automatically generates pattern creation templates in the transformation document. These templates (when invoked by a transformation processor at a later time while processing a source document with the transformation document) will cause particular patterns to be created in a result document. In addition, the TDGM generates zero or more copy templates in the transformation document to copy identical elements, if any, from the source document to the result document. Once that is done, the transformation document is created and may be refined by a user. By performing much of the underlying document analysis for the user, and by generating an initial transformation document, the TDGM simplifies the transformation document creation process.

24 Claims, 14 Drawing Sheets

```
<Person>
    <Name>
        <First> Value </First>
        <Middle> Value </Middle>
        <Last> Value </Last>
    </Name>

<Address>
        <Street> Value </Street>
        <City> Value </City>
        <State> Value </State>
        <ZipCode> Value </ZipCode>
    </Address>
</Person>
```

```
<Person>
    <Name>
        <First> Value </First>
        <Middle> Value </Middle>
        <Last> Value </Last>
    </Name>

<Address>
        <Street> Value </Street>
        <City> Value </City>
        <State> Value </State>
        <ZipCode> Value </ZipCode>
    </Address>
</Person>
```

*Fig. 1*

```xml
<?xml version="1.0" ?>
<sourceDoc>
    <person>
        <name>
            <first>A</first>
            <middle>B</middle>
            <last>C</last>
        </name>
        <address>
            <street>D</street>
            <City>E</City>
            <state>F</state>
            <zipcode>G</zipcode>
        </address>
    </person>
    <pet>
        <type>cat</type>
        <Petname>tuffy</petname>
    </pet>
</sourceDoc>
```

*Fig. 3*

```
<?=xml version="1.0" ?>
<targetDoc>
    <person>
        <name>
            <first>A</first>
            <last>C</last>
        </name>
        <residence>
            <street>D</street>
            <city>E</city>
            <state>F</state>
            <zipcode>G</zipcode>
        </residence>
    </person>
    <pet>
        <type>cat</type>
        <petname>tuffy</petname>
    </pet>
</targetDoc>
```

*Fig. 4*

| PATTERN | REFERENCE ARRAY |
|---|---|
| SOURCE DOC | [1] |
| PERSON | [1] |
| NAME | [1] |
| FIRST | [1] |
| MIDDLE | [1] |
| LAST | [1] |
| ADDRESS | [1] |
| STREET | [1] |
| CITY | [1] |
| STATE | [1] |
| ZIP CODE | [1] |
| PET | [1] |
| TYPE | [1] |
| PET NAME | [1] |

| PATTERN | REFERENCE ARRAY |
|---|---|
| TARGET DOC | [1] |
| PERSON | [1] |
| NAME | [1] |
| FIRST | [1] |
| LAST | [1] |
| RESIDENCE | [1] |
| STREET | [1] |
| CITY | [1] |
| STATE | [1] |
| ZIP CODE | [1] |
| PET | [1] |
| TYPE | [1] |
| PET NAME | [1] |

*Fig. 9*

```xml
<?xml version="1.0" encoding="UTF-8"?>
<xsl:transform xmlns:xsl="http://www.w3.org/1999/XSL/Transform" version="1.0">
  <xsl:output method="xml" indent="yes" />

<!--This Xslt document was generated using iPlanet iIS Xslt Generator-->
  <?iis-generated-xslt-document versions="0.9"?>
  <?iis-xslt-generator-option scanForCopyAction="true"?>
  <?iis-xslt-generator-option scanForPatterns="true"?>
  <?iis-xslt-generator-option buildForCrossReference="true"?>
  <?iis-xslt-generator-option includeIISGenerationPI="true"?>
  <?iis-xslt-generator-option includeIISGenerationOptioZAnsPI="true"?>
  <?iis-xslt-generator-option defaultRule="GO_DEF_RULE_NONE"?>
  <?iis-xslt-generator-option basedOn="GO_SOURCE_TARGET"?>
  <?iis-xslt-generator-option targetSource="GO_FROM_FILE_PATH"?>
  <?iis-xslt-generator-option targetName="FileName"?>
  <?iis-xslt-generator-option targetFilePath="f:\iis_workspace\iisdevtoolsproject\javasource\com\iplanet\iis\devtools\test\iisxslttools\designer\xmlsamples\bttargetdoc.xml"?>
  <?iis-xslt-generator-option sourceSource="GO_FROM_FILE_PATH"?>
  <?iis-xslt-generator-option sourceName="FileName"?>
  <?iis-xslt-generator-option sourceFilePath="f:\iis_workspace\iisdevtoolsproject\javasource\com\iplanet\iis\devtools\test\iisxslttools\designer\xmlsamples\btsourcedoc.xml"?>
  <?iis-xslt-generator-option iis-pi-generation-order="GO_ORDER_DEAULT_ROOT_TEMP"?>
  <?iis-xslt-generator-option iis-pi-generation-order="GO_ORDER_TARGET_TEMPS"?>
  <?iis-xslt-generator-option iis-pi-generation-order="GO_ORDER_SOURCE_TEMPS"?>
  <?iis-xslt-generator-option iis-pi-generation-order="GO_ORDER_COPY_TEMPS"?>
  <?iis-xslt-generator-option iis-pi-generation-order="GO_ORDER_DEFAULT_TEMPS"?>

<?iis-generated-xslt-code iis-root-template="iis-root-template"?>
     <?iis-generated-xslt-code iis-root-template="iis-from-target"?>
     <xsl:template match="/">
        <targetDoc>
           <xsl:apply-templates />
        </targetDoc>
     </xsl:template>

<?iis-generated-xslt-code iis-item-needed="iis-template-pattern"?>
     <xsl:template match="person">
        <person>
           <xsl:apply-templates />
        </person>
     </xsl:template>
```

Fig. 10A

```
<?iis-generated-xslt-code iis-item-needed="iis-template-pattern"?>
<xsl:template match="pet">
    <pet>
        <xsl:apply-templates />
    </pet>
</xsl:template>
```
— 1048

```
<?iis-generated-xslt-code iis-item-needed="iis-template-pattern"?>
<xsl:template match="type">
    <type />
</xsl:template>
```
— 1052

```
<?iis-generated-xslt-code iis-item-needed="iis-template-pattern"?>
<xsl:template match="petname">
    <petname />
</xsl:template>
```
— 1056

```
<xsl:template match="sourceDoc">
    <?iis-generated-xslt-code iis-item-needed="iis-action-needed"?>
</xsl:template>
```
— 1057

```
<xsl:template match="middle">
    <?iis-generated-xslt-code iis-item-needed="iis-action-needed"?>
</xsl:template>
```
— 1059

```
<?iis-generated-xslt-code iis-action="iis-copy"?>
<xsl:template match="/sourceDoc/pet[1]">
    <xsl:copy />
</xsl:template>
```
— 1060

```
<?iis-generated-xslt-code iis-action="iis-copy"?>
<xsl:template match="/sourceDoc/person[1]/address[1]/zipcode[1]">
    <xsl:copy />
</xsl:template>
```
— 1064

```
<?iis-generated-xslt-code iis-action="iis-copy"?>
<xsl:template match="/sourceDoc/person[1]/name[1]/last[1]">
    <xsl:copy />
</xsl:template>
```
— 1068

```
<?iis-generated-xslt-code iis-action="iis-copy"?>
<xsl:template match="/sourceDoc/person[1]/address[1]/state[1]">
    <xsl:copy />
</xsl:template>
```
— 1072

```
<?iis-generated-xslt-code iis-action="iis-copy"?>
<xsl:template match="/sourceDoc/person[1]/address[1]/city[1]">
    <xsl:copy />
</xsl:template>
```
— 1076

*Fig. 10C*

```
<?iis-generated-xslt-code iis-action="iis-copy"?>
  <xsl:template match="/sourceDoc/person[1]/name[1]/first[1]">
    <xsl:copy />
  </xsl:template>
```
⎤  
⎦ ⟵ 1080

```
<?iis-generated-xslt-code iis-action="iis-copy"?>
  <xsl:template match="/sourceDoc/person[1]/address[1]/street[1]">
    <xsl:copy />
  </xsl:template>
</xsl:transform>
```
⎤  
⎦ ⟵ 1084

*Fig. 10D*

ENHANCED MECHANISM FOR AUTOMATICALLY GENERATING A TRANSFORMATION DOCUMENT

FIELD OF THE INVENTION

This invention relates generally to computer systems, and more particularly to an enhanced mechanism for automatically generating a transformation document.

BACKGROUND

The XML (eXtensible Markup Language) specification established by the W3C Organization provides a standardized methodology for exchanging structured data between different mechanisms. The different mechanisms may be different components within the same system (e.g. different program components) or they may be completely separate systems (e.g. systems of different companies, or different servers on the World Wide Web). Basically, XML allows structured data to be exchanged in a textual format using "element tags" to specify structure and to delimit different sets of data.

An example of a portion of an XML document is shown in FIG. 1. In this example, information about a person is being exchanged. To indicate that the information pertains to a person, the "person" element tags are used to delimit the data. Nested within the "person" element tags are two sets of information: (1) a name; and (2) an address. These sets of information are also delimited using the "Name" and "Address" element tags, respectively. Nested within the "Name" element tags are three child elements, namely, a first, middle, and last name, each of which is delimited by respective element tags, and each of which has an associated value. Likewise, nested within the "Address" element tags are four child elements, namely, a street, city, state, and zip code, each of which is delimited by respective element tags, and each of which has an associated value. By delimiting the sets of data using nested element tags in this manner, the XML document makes it clear how the data is structured, and what each set of data represents. As a result, any mechanism that is capable of understanding the element tags used to delimit the data will be able to interpret and process the data. In this manner, XML makes it possible to exchange structured data in a textual, program-independent, and platform-independent manner. It is this general nature of XML that makes it so flexible and versatile. Because of its versatility, XML has grown significantly in popularity in recent years. The above discussion provides just a brief description of the XML specification. More information on XML may be found on the W3C website at [www.]w3c.org (Note: the reference to w3c.org is not intended to be a hyperlink.) All of the information on that website, as of the filing date of the present application, is incorporated herein by reference.

In some instances, before data in an XML document can be processed or rendered, the XML document first needs to be transformed. For example, if the information of the person shown in FIG. 1 is to be rendered on a cellular phone display, and the cellular phone display does not have enough room for a middle name, then the XML document may first need to be transformed by removing the "middle" name element before the information is provided to the cellular phone to be displayed. As another example, the element tag used in one system may differ from the element tag used in another system. For example, the "person" element tag in one system may correspond to the "employee" element tag in another system. Before the XML document is processed into the other system, the XML document is first transformed to change the "person" element tag to an "employee" element tag. These are examples of simple transformations that can be made to an XML document. Many other more complex transformations may also be made.

To enable an XML document (referred to as a source document) to be transformed into another document (referred to as a target document), there is currently provided a transformation language, known as XSLT (eXtensible stylesheet language transformation). Using XSLT, a transformation document can be created which, when processed together with the source document, gives rise to the target document. In effect, the transformation document specifies the transformations that need to be made to the source document to derive the target document. For example, the transformation document may specify that whenever a "person" element tag is encountered in the source document, an "employee" element tag should be created in the target document. According to the XSLT specification, the transformation document is itself an XML document; thus, it conforms to all of the requirements to which all XML documents conform.

If it is known from the outset how a source document is to be transformed to derive a target document, then the creation of a transformation document is relatively straightforward. A user or programmer simply creates templates in the transformation document, using XSLT, to implement all of the desired transformations. In many implementations, however, it is not known how a source document is to be transformed to derive a target document. Instead, a user/programmer is simply given a source document and a target document, and asked to create a transformation document that will transform the source document into the target document. This can be a very daunting task because it can potentially require the user/programmer to intensely analyze and compare both documents to determine the transformations that need to be made. If the two documents are lengthy, the amount of manhours required to create the transformation document could be immense. Given the difficulty and the amount of resources currently required to manually create a transformation document from a source and a target document, it is evident that a mechanism for facilitating the document creation process is needed.

SUMMARY OF THE INVENTION

In light of the shortcomings of the prior art, there is provided, in one embodiment of the present invention, a mechanism for automatically generating a transformation document given a source document and a target document. In one embodiment, a transformation document generation mechanism (TDGM) analyzes each document to determine the structural patterns found in each. As each document is analyzed, a pattern dictionary is built that records each pattern found in each document. After the analysis of the documents is performed, the TDGM proceeds to automatically generate the transformation document.

In one embodiment, for each particular pattern that occurs in the target document, the TDGM performs the following. Initially, the TDGM determines whether there is a matching pattern that occurs in the source document that literally matches the particular pattern in the target document. If so, then the TDGM automatically generates a template in the transformation document. This template will cause the particular pattern to be created in a result document, and will be triggered when a triggering pattern is encountered. The triggering pattern is specified and associated with the template so that unless the triggering pattern is encountered when the transformation document is processed, the template will not be invoked. In this case, because a literally matching pattern is found in the source document for the particular pattern in the target document, the triggering pattern for the template is specified to be the matching pattern found in the source document.

If a literally matching pattern is not found in the source document for the particular pattern in the target document, then the TDGM, in one embodiment, proceeds to determine whether there is a matching pattern in the source document for a synonym of the particular pattern. To make this determination, the TDGM in one embodiment first accesses a synonym dictionary provided by a user that specifies one or more synonyms for one or more particular patterns. For example, the synonym dictionary may specify that for the particular pattern "employee" in the target document, a synonym pattern is "person". If a synonym pattern is found in the synonym dictionary for the particular pattern, then the TDGM proceeds to determine whether there is a matching pattern in the source document that literally matches the synonym pattern. If so, then the TDGM automatically generates a template in the transformation document. This template will cause the particular pattern to be created in a result document, and will be triggered when a triggering pattern is encountered. In this case, because a matching pattern is found in the source document for the synonym of the particular pattern in the target document, the triggering pattern for the template is specified to be the matching pattern found in the source document.

If neither a literal match nor a synonym match is found in the source document for the particular pattern in the target document, then the TDGM automatically generates a non-matching template in the transformation document. This template will cause the particular pattern to be created in a result document, and will be triggered when a special triggering pattern is encountered. Since no matching pattern is found, it is difficult in this case for the TDGM to determine, without purely guessing, what triggering pattern should cause the particular pattern to be created in the result document. Thus, in one embodiment, the TDGM does not specify an actual triggering pattern but rather sets the triggering pattern to "iis-pattern-needed". That way, when a user reviews the transformation document after it has been generated by the TDGM, the user will know from the "iis-pattern-needed" indication that the user needs to provide a triggering pattern for the template. In one embodiment, the TDGM carries out the above process for each particular pattern that occurs in the target document.

In addition to the pattern creation templates noted above, the TDGM in one embodiment further generates zero or more copy templates in the transformation document. The copy templates copy identical elements (elements having the same structural format and the same data values), if any, from the source document to the result document. Once that is done, the TDGM will have generated a transformation document that can be processed with the source document to derive a result document that is at least an approximation of the target document. This transformation document may be further refined/changed by a user, but it at least provides a starting document from which the user can work. By performing much of the underlying document analysis for the user, and by generating an initial transformation document, the TDGM significantly reduces the amount of effort required on the part of the user. Thus, the TDGM greatly facilitates the transformation document creation process.

BRIEF DESCRIPTION OF THE DRAWINGS

FIG. 1 illustrates a portion of a sample XML document.

FIG. 3 shows a sample source document for use in illustrating the operation of one embodiment of the TDGM.

FIG. 4 shows a sample target document for use in illustrating the operation of one embodiment of the TDGM.

FIG. 8 shows a pattern dictionary for the sample source document of FIG. 3 generated in accordance with one embodiment of the present invention.

FIG. 9 shows a pattern dictionary for the sample target document of FIG. 4 generated in accordance with one embodiment of the present invention.

FIGS. 10A–10D show a sample transformation document generated in accordance with one embodiment of the present invention based upon the sample documents of FIGS. 3 and 4.

DETAILED DESCRIPTION OF EMBODIMENT(S)

Functional Overview

Figure 2:
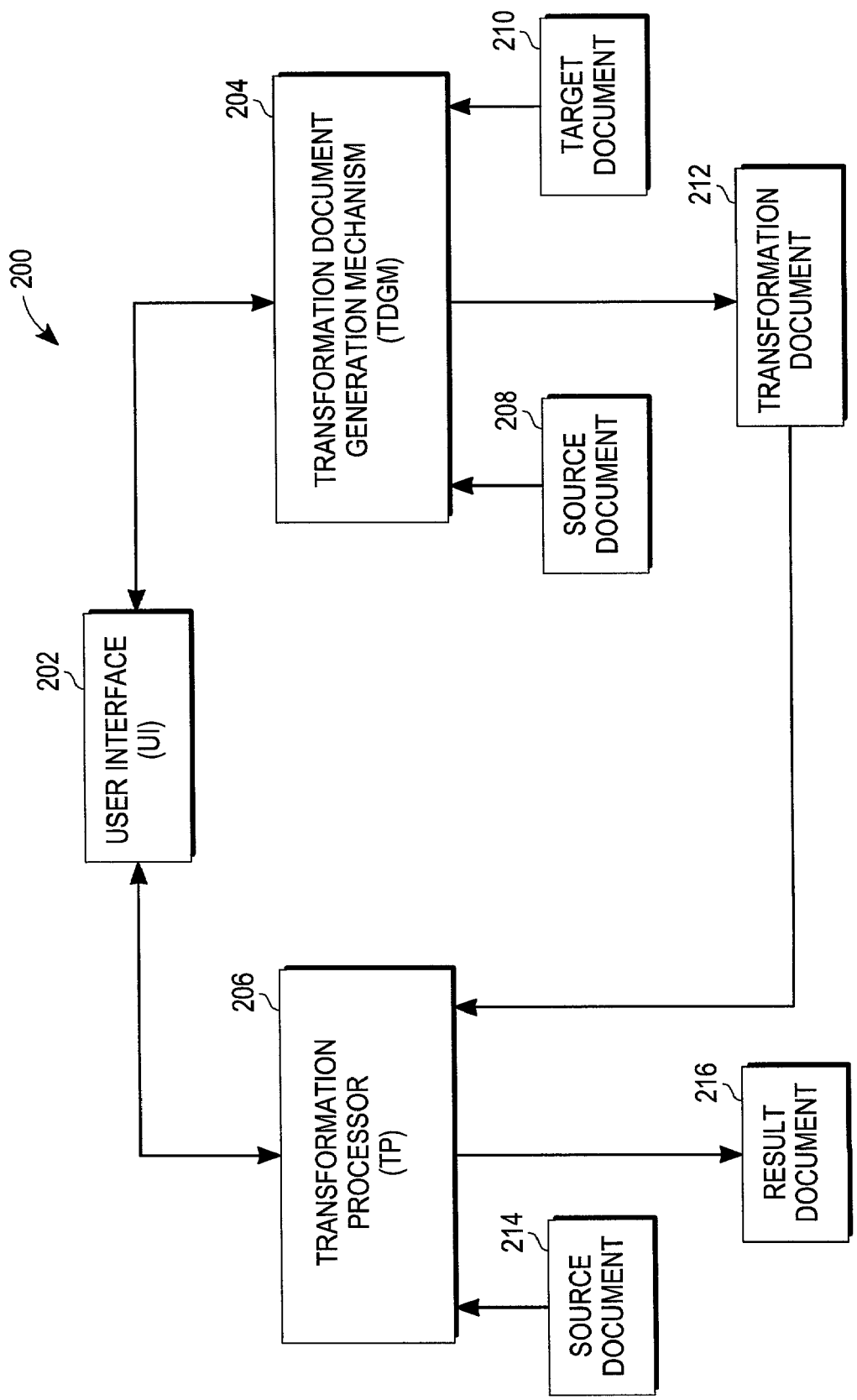
FIG. 2 is a functional block diagram of a system in which one embodiment of the present invention may be implemented.

With reference to FIG. 2, there is shown a functional block diagram of a system 200 in which one embodiment of the present invention may be implemented. As shown, system 200 comprises a user interface (UI) 202, a transformation document generation mechanism (TDGM) 204, and a transformation processor (TP) 206.

The UI 202 provides a mechanism for enabling a user to interact with the other components 204, 206 of the system 200. For purposes of the present invention, UI 202 may be any type of user interface, including but not limited to a simple text-based user interface and a full-function graphical user interface. UI 202 enables a user to provide input to, view output of, and invoke the functionality of the TDGM 204 and the TP 206. For example, a user may use UI 202 to invoke the TDGM 204 and to specify document generation options thereto, and to view and edit the transformation document 212 that is generated by the TDGM 204. Similarly, the user may use UI 202 to invoke the TP 206, and to view the result document 216 that is generated by the TP 206. UI 202 may also be used by a user to create, edit, and populate a synonym dictionary (not shown). Basically, in one embodiment, the synonym dictionary comprises user-specified mappings that map certain patterns in a target document to certain patterns in a source document. As will be explained in a later section, these mappings may be used by the TDGM 204 to generate the transformation document 212 such that the transformation document 212 will transform certain patterns in a source document into certain patterns in a result document.

In response to an invocation either from UI 202 or from another mechanism (e.g. another program), the TDGM 204 generates a transformation document 212. In one embodiment, the TDGM 204 generates the transformation document 212 based upon a source document 208 and a target document 210 (and a synonym dictionary if one is provided). In alternative embodiments, the TDGM 204 may generate the transformation document 212 based solely upon the source document 208 or the target document 210. In addition, the TDGM 204 may generate the transformation document 212 based upon multiple source documents and/or multiple target documents. These and other implementations are within the scope of the present invention.

In generating the transformation document 212, the TDGM 204 in one embodiment attempts to create a document that, when processed with the source document 208, will produce the target document 210. Ideally, the transformation document 212 generated by the TDGM 204 is one that, when processed with the source document 208, will give rise to an exact replica of the target document 210. However, this is often not possible. In many instances, the TDGM 204 generates a transformation document 212 that, when processed with the source document 208, gives rise to an approximation of the target document 210. Given this transformation document 212, the user can make further edits using the UI 202 to refine the document 212 so that when the document 212 is processed with the source document 208, the result document is as close as possible to the target document 210.

Once generated, the transformation document 212 may be processed by the TP 206 in conjunction with a source document 214 to derive a result document 216. Source document 214 may be the same document as source document 208, or it may be another document of the same type as source document 208. One point to note regarding transformation document 212 is that it can be used to transform not just the source document 208 from which it was derived but rather any number of documents that are of the same type as source document 208. As a result, once created and tuned by the user, the transformation document 212 may be used to transform an entire class or batch of source documents 214. Based upon the source document 214 and the transformation document 212, the TP 206 produces a result document 216, which represents the transformed version of the source document 214, transformed in accordance with the transformation document 212. If the source document 214 is the same document as source document 208, then the result document 216 will be at least an approximation of target document 210.

Background Information

From a conceptual standpoint, the present invention as described herein may be applied to any type of source, target, and transformation document written in any language. To facilitate a complete understanding, however, the invention will be described below with reference to a specific example. In the following example, it will be assumed that the source document 208 and the target document 210 are XML documents, and that the transformation document 212 is an XSLT document. It should be noted, however, that this example is used for illustrative purposes only, and that it should not be construed to limit the invention in any way.

XML Source and Target Documents

In one embodiment, the source document 208 and the target document 210 are XML documents, and like most XML documents, take the form of text documents comprising one or more element tags and one or more data sets. As shown in the sample XML document of FIG. 1, the element tags may be nested within other element tags to give rise to a hierarchical structure, which defines the structural relationships between the various elements and sets of data. Because they specify a hierarchical structure, XML documents lend themselves to being represented by tree-type representations. In fact, many XML documents are not processed directly but rather are first parsed and transformed into tree representations, and then processed using the tree representations.

An XML document may be represented using any type of tree structure, but one tree structure that is commonly used is the one provided by the document object model (DOM). More specifically, an XML document may be parsed into objects using the DOM, and the DOM represents the parsed document as an object tree with a plurality of nodes. The DOM provides a rich tree representation for the XML document. Given any node on the tree, the DOM tree representation provides all information pertinent to that node. For example, the DOM tree provides information as to which node is the parent of that node, which nodes are children of that node, and which nodes are siblings of that node. Given this information, it can be easily determined where a particular node fits within the XML document. This is a very brief description of the DOM. More information and a specification for the DOM can be found on the W3C website at "w3.org (Note: the reference to w3c.org is not intended to be an active hyperlink)"

XSLT Transformation Document

In one embodiment, the transformation document 212 takes the form of a document written in the XSLT language. In large part, an XSLT document comprises one or more templates. Each template generally comprises two parts: (1) a triggering pattern specification; and (2) one or more operations or actions. The triggering pattern specifies what structural pattern in a source document will cause the template to be triggered or invoked. Recall that the transformation document 212 is processed by the TP 206 in conjunction with a source document 214. If the source document 214 has the structural pattern specified in the triggering pattern of a template, then the TP 206 will invoke that template when the triggering pattern is encountered in the source document 214.

When a template is invoked, the operations or actions specified in that template are performed by the TP 206. According to XSLT, a number of different operations may be specified in a template. These operations include but are not limited to: (1) outputting a literal; (2) copying a pattern; and (3) applying templates. The "outputting a literal" operation causes the TP 206 to write a literal to the result document 216. The literal may be an element tag, an element value, an attribute value, or any other set of text. For example, suppose that it is desired to convert a "person" element tag in the source document 214 to an "employee" element tag in the result document 216. In such a case, a template may be created having "person" declared as the triggering pattern, and the action being to write the literals "<employee>" and "</employee>" to the result document 216. That way, when the "person" pattern is encountered in the source document 214, the template is invoked and the literals "<employee>" and "</employee>" are written to the result document 216.

The copying operation causes the TP 206 to copy an element and all of its child elements and data values directly from the source document 214 to the result document 216. This operation is useful when it is desirable to create in the result document 216 an identical copy of an element found in the source document 214. By identical, it is meant that the structural pattern and the data values within the element are the same. The copying operation will be elaborated upon in a later section.

The "apply templates" operation causes the TP 206 to apply all of the matching templates in the transformation document 212 to all of the children of a particular element in the source document 214. The apply templates operation is useful for fully processing all of the children of a particular node in the source document. Use of the apply templates operation will be elaborated upon in a later section.

The above is a very brief description of the types of operations and actions that can be specified in an XSLT template. More information and a specification for XSLT can be found on the W3C website at "w3.org (Note: the reference to w3c.org is not intended to be an active hyperlink)"

TDGM Operation

Figure 5:
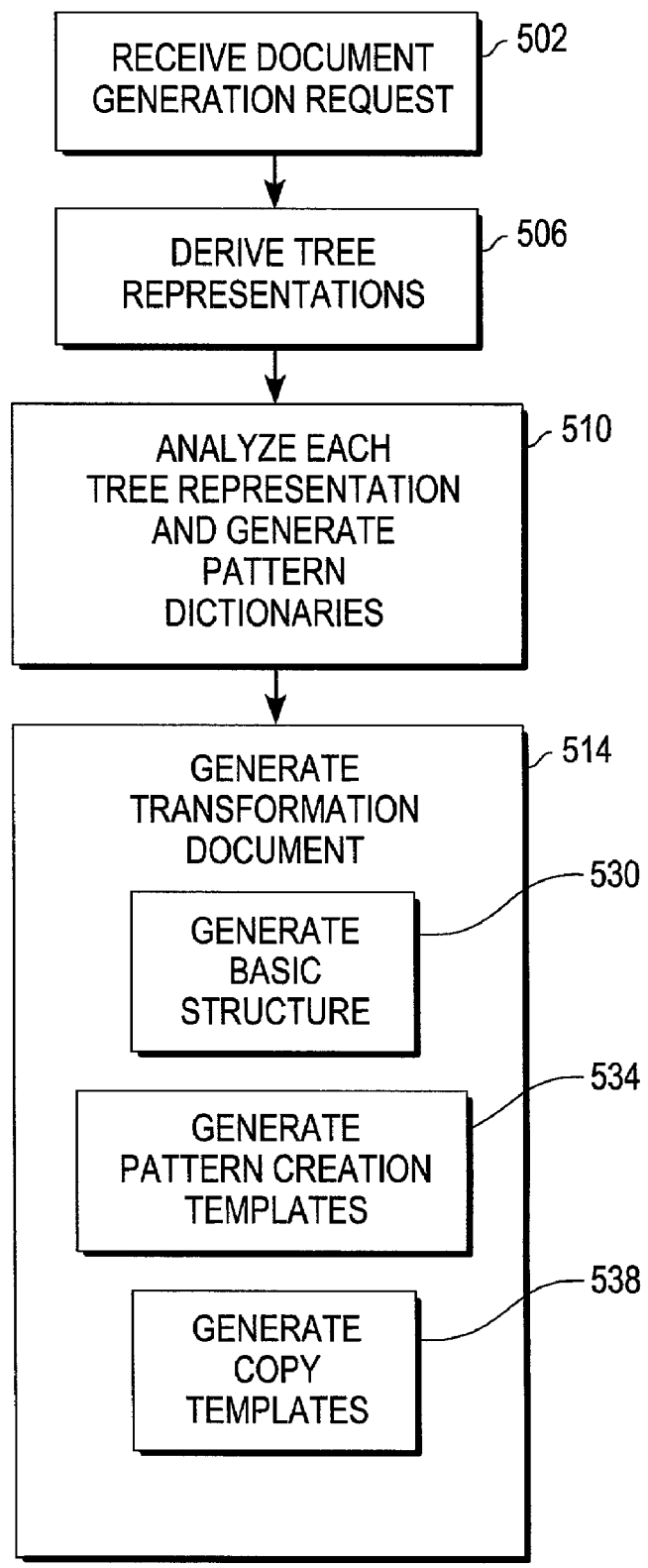
FIG. 5 is an operational flow diagram illustrating the operation of one embodiment of the TDGM.

With the above background information in mind, the operation of one embodiment of the TDGM 204 will now be described. In the following description, reference will be made to some sample documents to fully illustrate the operation of the TDGM 204. Specifically, the XML document shown in FIG. 3 will be used as the sample source document 208, while the XML document shown in FIG. 4 will be used as the sample target document 210. The transformation document 212 will be generated based upon these sample documents. Operation of the TDGM 204 will be described with reference to the operational flow diagram shown in FIG. 5.

Initially, the TDGM 204 operates by receiving (502) a request, either from a user via the UI 202 or another mechanism (e.g. another program), to generate a transformation document. Included in this request may be several sets of information, including but not limited to, information indicating which documents are to be the source and target documents, a reference to a synonym dictionary, and information specifying the options, if any, according to which the transformation document 212 is to be generated. The options offered by the TDGM 204 may differ from implementation to implementation. For purposes of illustration, it will be assumed that the request specifies the documents shown in FIGS. 3 and 4 as the source and target documents, respectively.

Figure 6:
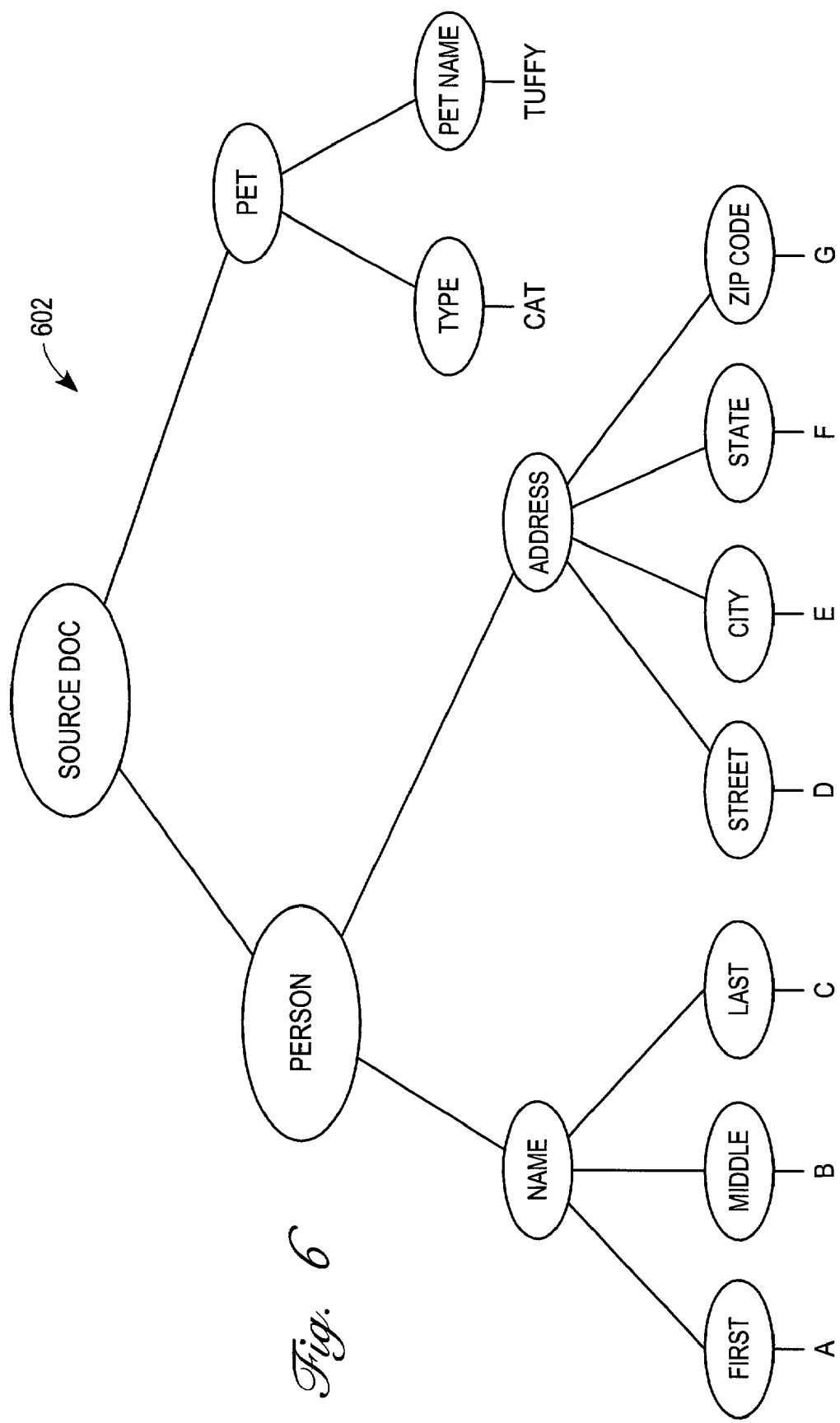
FIG. 6 shows a tree representation of the sample source document of FIG. 3.
Figure 7:
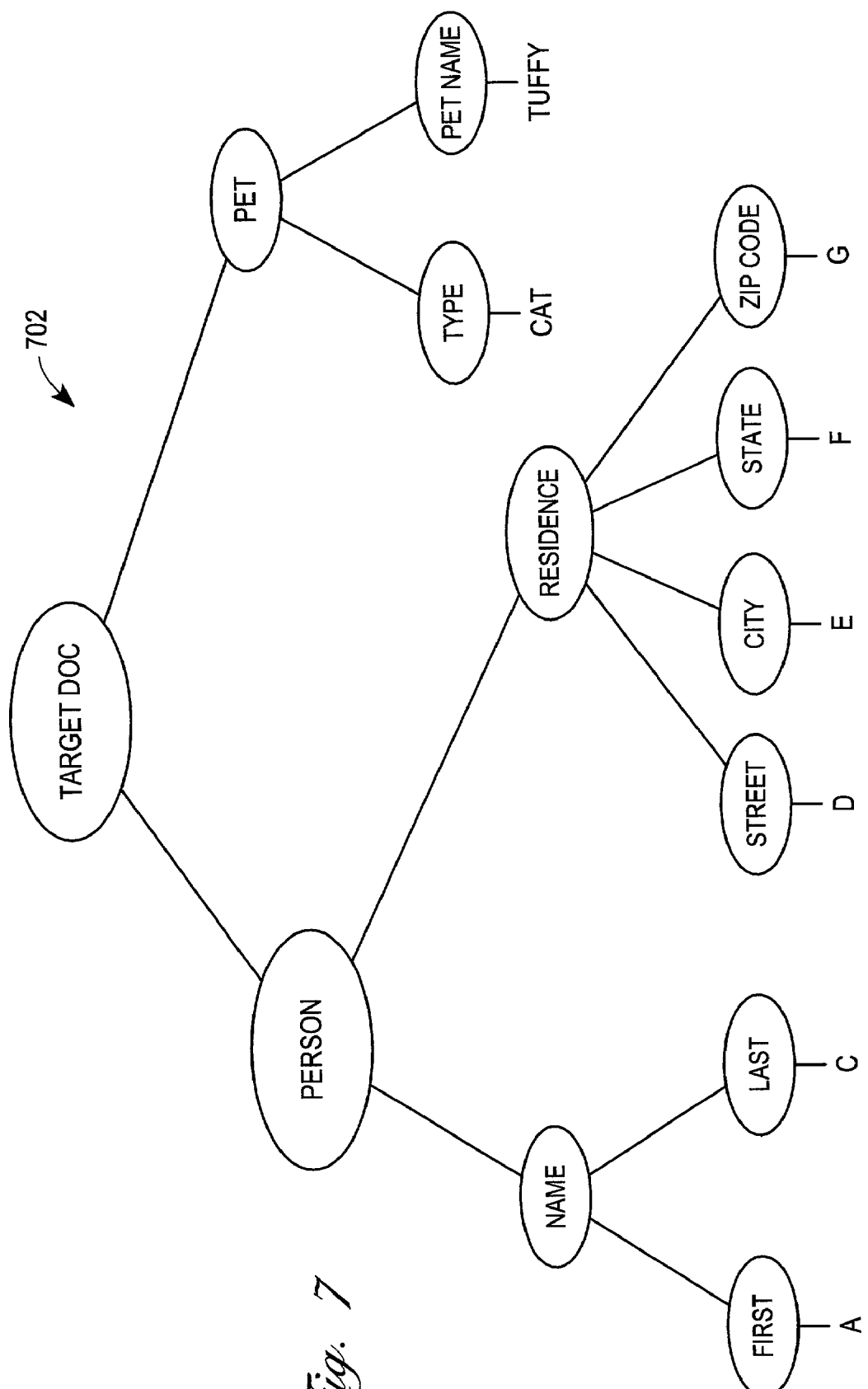
FIG. 7 shows a tree representation of the sample target document of FIG. 4.

After receiving the document generation request, the TDGM 204, in one embodiment, proceeds to derive (506) a tree structure representation for each of the sample documents. In one embodiment, the TDGM 204 derives a tree representation by parsing a document in accordance with the DOM specification to give rise to an object tree. In an alternative embodiment, the TDGM 204 derives a tree representation by accessing an already parsed version of the document. Whatever the case, the parsing of an XML document and the development of a tree representation according to the DOM is well known; thus, it need not be discussed in detail herein. With reference to FIGS. 6 and 7, a tree representation for each of the sample documents is shown. Specifically, FIG. 6 illustrates a tree representation 602 for the sample source document 208 of FIG. 3, while FIG. 7 shows a tree representation 702 for the sample target document 210 of FIG. 4.

After the tree representations of the sample documents are derived, the TDGM 204 proceeds to analyze (510) each tree representation and to generate a pattern dictionary for each sample document to record all of the patterns that occur in that document. In generating a pattern dictionary for a document, the TDGM 204 in one embodiment traverses the tree representation for that document. Starting at the root node, the TDGM 204 traverses each node of the tree. For each node encountered, the TDGM 204 determines whether that node is a newly encountered node (i.e. whether the node already exists in the pattern dictionary). If the node does not already exist in the pattern dictionary, then the TDGM 204 adds that node to the pattern dictionary as a new pattern. Along with the node, the TDGM 204 stores a reference to where that node is located in the tree representation. This reference enables the TDGM 204 to quickly access the node on the tree at a later time. In this manner, the node is recorded in the pattern dictionary.

Suppose, however, that the node is not a newly encountered node but rather is one that already exists in the pattern dictionary. In such a case, the node is not inserted into the pattern dictionary as a new pattern. Instead, a reference to the node is just added to the existing node entry in the pattern dictionary. That way, the node is recorded as a reoccurrence of an existing pattern. For example, if there are two occurrences of a "person" pattern in a document, the pattern dictionary for that document would contain only one entry for the "person" pattern, but that entry would contain two references to the tree representation for that document. Each reference would refer to a particular location in the tree representation where the occurrence of the "person" pattern can be found.

If the tree representations 602, 702 of FIGS. 6 and 7 are processed in the manner just described, the pattern dictionaries shown in FIGS. 8 and 9 may be derived. FIG. 8 shows the pattern dictionary 802 derived for the sample source document 208 of FIG. 3, while FIG. 9 depicts the pattern dictionary 902 derived for the sample target document 210 of FIG. 4. Notice that each pattern dictionary 808, 902 comprises a complete list of all of the unique element nodes in the corresponding tree representation. Also notice that each entry of each pattern dictionary has an associated reference array. It is this reference array that stores a reference to each occurrence of the pattern in the entry in a corresponding tree representation. For example, for the "SourceDoc" entry in the pattern dictionary of FIG. 8, the reference array contains a reference to each location in the source document's tree representation (FIG. 6) where an occurrence of the "SourceDoc" pattern can be found. Because the pattern dictionaries include these references to the corresponding tree representations, the pattern dictionaries may be used to quickly access any occurrence of any pattern on any tree representation.

After the source and target documents 208, 210 are analyzed and the pattern dictionaries 802, 902 are built, the TDGM 204 proceeds to generate (514) the transformation document 212. In one embodiment, the document generation operation (514) comprises several parts: (1) generating the basic structure of the transformation document 212, which may include generating zero or more processing instructions (530); (2) generating pattern creation templates (534); and (3) generating copy templates (538). To illustrate how each of these parts is carried out, reference will be made to FIGS. 10A–10D, which show a sample transformation document 212. This transformation document 212 is generated in accordance with one embodiment of the present invention based upon the sample source document 208 and the sample target document 210.

In generating (530) the basic structure of the transformation document 212, the TDGM 204 generates and inserts some basic information into the transformation document 212. As shown in portion 1004 of FIG. 10A, this information may comprise an indication that the document 212 is a transformation document, and a specification of where a namespace for the document is located. The basic information may also include zero or more processing instructions. These processing instructions may indicate, for example, where the source document 208 and the target document 210 may be found in a file system. The processing instructions may also indicate any options that were implemented to generate the document. These and other sets of information may be specified by the processing instructions. When the TP 206 processes the transformation document 212 in conjunction with a source document, the TP 206 may use the information in the processing instructions to determine one or more of its behaviors.

In addition to the basic information already described, the TDGM 204 also creates a basic template 1008 in the transformation document 212, the purpose of which is to start the processing of the transformation document 212 by the TP 206. As shown in FIG. 10A, template 1008 has a triggering pattern of "/". This means that it is triggered whenever the root node of the source document is encountered by the TP 206. Unless there is an error, the root node of the source document should be encountered every time the transformation document 212 is processed with a source document. Thus, template 1008 should be invoked every time.

When invoked, the template 1008 causes several actions to be performed. First, it causes the literal "<TargetDoc>" to be outputted to a result document 216 (note that TargetDoc is the name of the root node of the target document 210). Then, it causes all of the templates in the transformation document 212 to be applied to the children of the root node of the source document (this is the effect of the "xsl:apply-templates" action). Note that when the templates of the transformation document 212 are applied to the children of the root node, the templates will be triggered only if the children of the root node have the triggering patterns specified for the templates. After all of the templates have been applied to the children of the root node, the template 1008 outputs the literal "</TargetDoc>" to the result document 216. At that point, execution of the template 1008 is complete. Basically, the function of the basic template 1008 is to create a main element tag of "TargetDoc" in the result document, and to start document processing at the root node of the source document. With the template 1008 and the basic information of portion 1004 thus created, the foundation of the transformation document 212 is established.

After the document foundation is established, the TDGM 204 proceeds to generate (534) the pattern creation templates of the transformation document 212. One purpose of these templates is to ensure that when the transformation document 212 is processed with a source document, all of the patterns in the target document 210 are created in the result document 216. In one embodiment, each template causes one pattern to be created in the result document 216. According to one embodiment, the TDGM 204 generates the pattern creation templates by scanning through the pattern dictionary 902 (FIG. 9) of the target document 210, and creating a template for each pattern found in the pattern dictionary 902 (except for the root pattern TargetDoc, for which a template has already been generated). In one embodiment, a pattern creation template is generated as follows.

Initially, the TDGM 204 selects a particular pattern (e.g. "person") from the target document's pattern dictionary 902 (FIG. 9), and accesses the reference array for that particular pattern. Using a reference in the reference array, the TDGM 204 accesses a particular node on the tree representation 702 (FIG. 7) of the target document 210. This particular node is a node at which the particular pattern is found in the tree representation 702. Once the particular node on the tree representation is accessed, the TDGM 204 determines whether that node has any child nodes. Recall that the DOM tree representation provides a significant amount of information about a node, including whether the node has any child nodes. Thus, once the TDGM 204 accesses the particular node, the TDGM 204 can determine whether the particular node has any child nodes. Armed with the name of the particular pattern and the knowledge of whether the pattern has any children, the TDGM 204 proceeds to generate the pattern creation template for the particular pattern.

To generate the template, the TDGM 204 first generates a general template structure. Within this structure, the TDGM 204 specifies a triggering pattern and a list of one or more actions. As noted previously, the triggering pattern dictates when the template is invoked, and the list of actions determines what the TP 206 will do when the template is invoked. In one embodiment, to determine what triggering pattern to specify for the template, the TDGM 204 first determines whether there is a pattern in the source document's pattern dictionary 802 that literally matches the particular pattern that has been selected from the target document's pattern dictionary 902. In the current example, the particular pattern selected from the target document's pattern dictionary 902 is "person"; thus, the TDGM 204 searches the source document's pattern dictionary 802 for a literally matching pattern of "person". In the current example, a matching pattern is found for "person". In such a case, the TDGM 204 specifies the literally matching pattern ("person") found in the source document's pattern dictionary 802 as the triggering pattern for the template. This can be seen in template 1012 of FIG. 10A. Effectively, whenever the pattern "person" is encountered in a source document, the template 1012 is invoked.

Suppose now that rather than selecting the "person" pattern, the TDGM 204 selects the "residence" pattern from the target document's pattern dictionary 902. For this pattern, there is no literally matching pattern in the source document's pattern dictionary 802. In one embodiment, when there is no literal match for a particular entry, the TDGM 204 proceeds to determine whether there is a synonym match. To illustrate, suppose that at the time the TDGM 204 was invoked, it was passed a reference to a synonym dictionary. Suppose further that the synonym dictionary comprises an entry that indicates that the pattern "residence" is synonymous with the pattern "address" (i.e. the pattern "residence" is mapped to the pattern "address"). When the TDGM 204 finds no literal match for the pattern "residence", it accesses the synonym dictionary and sees that "residence" has "address" as a synonym. Upon finding the synonym, the TDGM 204 searches the source document's pattern dictionary 802 for a matching pattern that literally matches the synonym "address". In the current example, a literal match is found for "address". In such a case, the TDGM 204 specifies the literally matching pattern ("address") found in the source document's pattern dictionary 802 as the triggering pattern for the template. This can be seen in template 1028 of FIG. 10B. Effectively, whenever the pattern "address" is encountered in a source document, the template 1028 is invoked. By using a synonym dictionary in this manner, it is possible for the TDGM 204 to generate a template that will transform a pattern in a source document into a different pattern (e.g. from "address" to "residence") in a result document 216.

In the above examples, a matching pattern was found in the source document's pattern dictionary 802 for the particular pattern selected from the target document's pattern dictionary 902. In some instances, however, it is possible that no matching entry (neither a literal matching entry nor a synonym matching entry) is found for a particular pattern. In such a case, without purely guessing, it is difficult for the TDGM 204 to determine what triggering pattern should be specified for the template. Thus, in one embodiment, the TDGM 204 does not specify an actual triggering pattern, but rather sets the triggering pattern to "iis-pattern-needed". That way, when a user reviews the transformation document 212 after it has been generated, the user will know from the "iis-pattern-needed" indication that the user needs to provide a triggering pattern for the template.

After the triggering pattern is specified in the template in accordance with the process described above, the TDGM 204 proceeds to specify the list of actions for the template. The list of actions specified for a template will depend upon whether the pattern being created by the template has children. If the pattern does not have children, then the TDGM 204 inserts one or more "output literal" operations into the template's action list. These output literal operations, when processed by the TP 206, will cause the TP 206 to create a particular pattern in the result document 216. For example, if the particular pattern for which the template is being created is the "person" pattern, then the actions of the template will comprise output literal operations for outputting the literals "<person>" and "</person>" to the result document 216, as shown in template 1012 of FIG. 10A. Likewise, if the particular pattern for which the template is being created is the "residence" pattern, then the actions of the template will comprise output literal operations for outputting the literals "<residence>" and "</residence>" to the result document 216, as shown in template 1028 of FIG. 10B.

If the pattern for which the template is being created has children, then in addition to the output literal operations noted above, the TDGM 204 further inserts an "apply templates" operation into the template action list. This will cause all of the matching templates of the transformation document 212 to be applied to all of the children of a particular node in the source document.

Figure 10B:
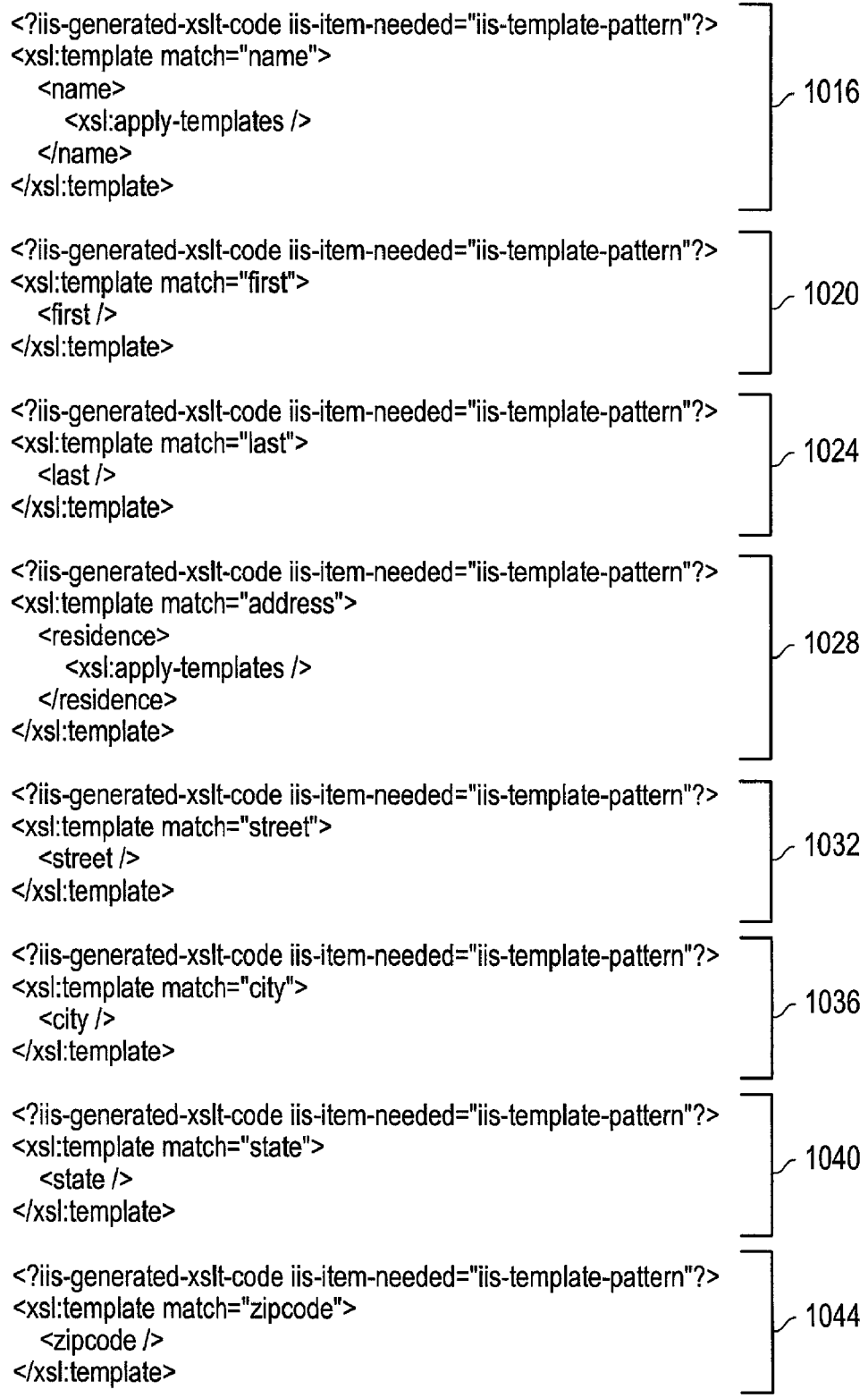

By applying the template generation process described above to each of the patterns in the target document's pattern dictionary 902, the TDGM 204 generates all of the pattern creation templates 1014–1056 shown in FIGS. 10A–10C.

The above process takes care of all of the patterns in the target document's pattern dictionary 902. However, it may leave some of the patterns in the source document's pattern dictionary 802 unprocessed. In the current example, the patterns "sourcedoc" and "middle" in the source document's pattern dictionary 802 do not match (either literally or synonymously) any of the patterns in the source document's pattern dictionary 902. Hence, they are left unprocessed. In one embodiment, for each non-matching pattern in the source document's pattern dictionary 802, the TDGM 204 creates a non-matching template. For each non-matching template, the triggering pattern is specified as the non-matching pattern to which the template pertains. For example, for the non-matching template pertaining to the non-matching pattern "middle", the triggering pattern is specified as the non-matching pattern "middle". As to the actions of the template, the TDGM 204 in one embodiment does not specify an action for a non-matching template. Instead, the TDGM 204 inserts an indication (e.g. "iis-action-needed") into the template that an action needs to be specified for the template. That way, when a user reviews the transformation document 212 after it has been generated, the user will know that an action for the template needs to be specified. By processing the non-matching patterns in the source document's pattern dictionary 802 in the manner described, the templates 1057 and 1059 shown in FIG. 10C are generated. The pattern creation templates are thus generated.

After the pattern creation templates are generated in the transformation document 212, the TDGM 204 proceeds to generate (538) zero or more copy templates. In generating the copy templates, the TDGM 204 initially determines whether there are any elements that are identical between the source document 208 and the target document 210. To be identical, two elements need to have identical structure and data values. If any identical element is found, then a copy template is generated in the transformation document 212 for that element. When the TP 206 processes the transformation document 212 in conjunction with a source document, this copy template will cause the TP 206 to copy the element from the source document to the result document 216.

In one embodiment, the TDGM 204 searches for identical elements between the source document 208 and the target document 210 in the following manner. The TDGM 204 initially selects one of the element entries in the source document's pattern dictionary 802 (FIG. 8). The TDGM 204 compares this element against all of the elements in the target document's pattern dictionary 902 (FIG. 9). If no match is found, then the TDGM 204 proceeds to the next element entry in the source document's pattern dictionary 802, and repeats the above process. On the other hand, if a matching element is found in the target document's pattern dictionary 902, then the TDGM 204 proceeds to determine whether the matching element is an exact match. In one embodiment, the TDGM 204 makes this determination by accessing and traversing the tree representations of the source and target documents.

To illustrate how this is done, reference will be made to an example. As shown in FIGS. 8 and 9, there is a match in the pattern dictionaries 802, 902 for the "person" element. Thus, when processing the dictionaries 802, 902, the TDGM 204 will find this element match, and will try to determine whether the match is an exact match. To determine whether the match is an exact match, the TDGM 204 accesses the reference array associated with the "person" entry of the source document's pattern dictionary 802. From this array, the TDGM 204 obtains a reference. This reference points to a node on the source document's tree representation 602 (FIG. 6) where an occurrence of the "person" element can be found. Using this reference, the TDGM 204 accesses the appropriate node on that tree 602. Likewise, the TDGM 204 accesses the reference array associated with the "person" entry of the target document's pattern dictionary 902. From this array, the TDGM 204 obtains a reference. This reference points to a node on the target document's tree representation 702 (FIG. 7) where an occurrence of the "person" element can be found. Using this reference, the TDGM 204 accesses the appropriate node on that tree 702. Once the tree representations 602, 702 are accessed, the TDGM 204 traverses the trees to determine whether the elements match exactly.

In one embodiment, the TDGM 204 performs the traversal by initially determining the children of the accessed nodes. As shown in FIG. 6, the "person" node of the source document has the nodes Name and Address as its child nodes. As shown in FIG. 7, the "person" node of the target document has the nodes Name and Residence as its child nodes. After the child nodes are determined, the TDGM 204 compares the child nodes to determine whether they are identical. If they are not (as is the case in the present example), then it is concluded that the element being tested (the "person" element) is not an exact match. In such a case, the TDGM 204 forgoes generating a copy template for the element, and proceeds to the next element in the source document's pattern dictionary 802 to look for an exact match for that element.

On the other hand, if the child nodes are identical, then the TDGM 204 proceeds further down the trees 602, 702 to test the child nodes of the child nodes. If all of those child nodes are identical, then the TDGM 204 further traverses the trees 602, 702 to test the child nodes of those child nodes. This process repeats until either a difference is found between the two elements, in which case the TDGM 204 concludes that the elements do not constitute an exact match, or all of the child nodes and data values have been tested and determined to be identical. If the elements are determined to be identical, then the TDGM 204 generates a copy template to copy the element from the source document to the result document 216.

In the sample source and target documents, an example of a matching element is the "pet" element. As can be seen from the tree representations shown in FIGS. 6 and 7, the "pet" element in both the source document and the target document have the two child nodes: Type and PetName. In addition, all of the corresponding child nodes have identical data values: "Cat" and "Tuffy". Thus, the "pet" elements match exactly. As a result, when the TDGM 204 processes the "pet" element in the source document's pattern dictionary 802, it will find an exact match, and hence, will generate a copy template for that element in the transformation document 212.

In one embodiment, the TDGM 204 generates a copy template by first generating a general template structure. Then, within this structure, the TDGM 204 specifies a triggering pattern. For a copy template, the triggering pattern is the element in the source document 208 for which an exact match was found in the target document 210. In one embodiment, the triggering pattern is specified in detail, indicating the full path to the element, and a specific instance of the element. For example, the triggering pattern for the "pet" element would be "/SourceDoc/pet[1]", where "/SourceDoc/Pet" indicates the full path to the element in the source document 208, and "[1]" indicates the first occurrence of the element in the source document 208.

In addition to the triggering pattern, the TDGM 204 further specifies in the template structure one or more template operations or actions. In one embodiment, for a copy template, the TDGM 204 inserts a single copy operation into the template. When invoked, this copy operation will cause the element specified in the triggering pattern to be copied to the result document 216. After the copy operation is inserted into the template structure, the generation of the copy template is completed. A sample copy template for the "pet" element is shown in FIG. 10C as template 1060. In the manner described, the TDGM 204 generates a copy template for each element in the source document's pattern dictionary 802 for which an exact match is found in the target document 210. For the sample source document 208 and target document 210, the copy templates that are generated by the TDGM 204 are shown in FIGS. 10C and 10D as templates 1060–1084. In the manner described, the TDGM 204 automatically generates the transformation document 212.

After the transformation document 212 is generated by the TDGM 204, the user may use the UI 202 to refine the transformation document 212. For example, the user may specify triggering patterns for the pattern creation templates. The user may also choose to delete some templates if they prove to be redundant or superfluous. In addition, the user may view the tree representations and the pattern dictionaries to further analyze the source and target documents. Overall, the user may refine the transformation document 212 in any way to achieve improved/desired results.

Hardware Overview

Figure 11:
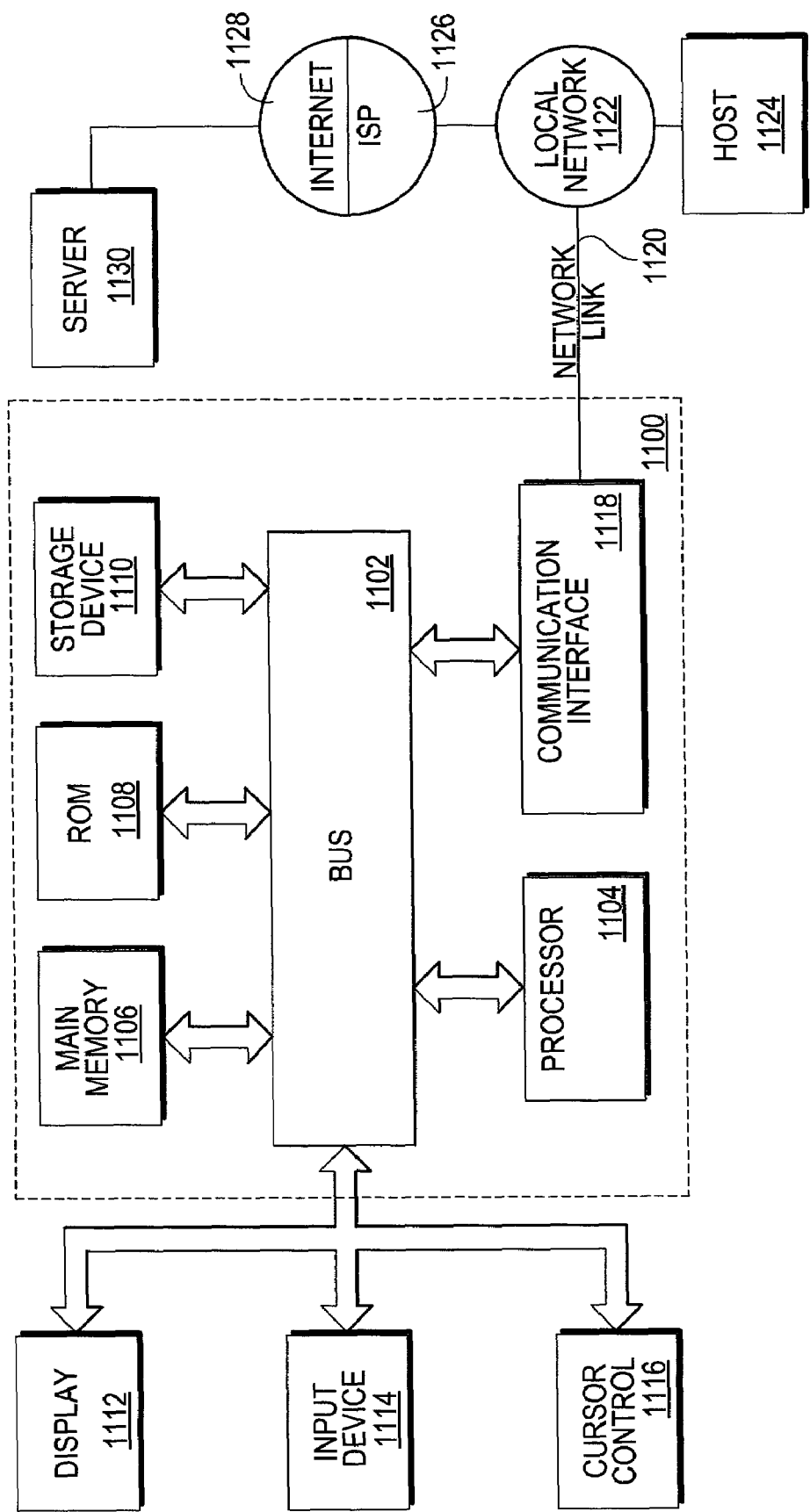
FIG. 11 is a hardware block diagram of a computer system in which one embodiment of the present invention may be implemented.

In one embodiment, the various components 202, 204, 206 of the present invention are implemented as sets of instructions executable by one or more processors. The invention may be implemented as part of an object oriented programming system, including but not limited to the JAVA™ programming system manufactured by Sun Microsystems, Inc. of Palo Alto, Calif. FIG. 11 shows a hardware block diagram of a computer system 1100 in which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 may also be further used to store temporary variables or other intermediate information during execution of instructions by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

According to one embodiment, the functionality of the present invention is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. In this manner, computer system 1100 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer-implemented method for generating a transformation document, comprising:
   analyzing a first document;
   analyzing a second document, wherein said second document comprises a plurality of data structure patterns; and
   automatically generating, based upon said first and second documents, a transformation document which, when processed in conjunction with said first document, gives rise to a result document that comprises a substantial portion of the plurality of data structure patterns in said second document, wherein automatically generating said transformation document comprises:
      selecting a particular data structure pattern from said plurality of data structure patterns in said second document;
      determining whether said first document comprises a matching data structure pattern that matches said particular data structure pattern;
      in response to a determination that said first document comprises said matching data structure pattern, inserting a template comprising one or more actions into said transformation document, said template being invoked when a particular triggering data structure pattern is encountered during processing of said transformation document, and when invoked, causes said particular data structure pattern to be created in said result document: and
      in response to a determination that said first document does not comprise said matching data structure pattern, inserting a non-match template comprising one or more actions into said transformation document, said non-match template which indicates to a user that a triggering data structure pattern needs to be specified for said non-match template, said non-match template, if invoked, causing said particular data structure pattern to be created in said result document.

2. The method of claim 1, wherein said first and second documents are XML (eXtensible Markup Language) documents.

3. The method of claim 2, wherein said transformation document is an XSLT (eXtensible Stylesheet Language Transformation) document.

4. The method of claim 1, wherein said particular triggering data structure pattern comprises said matching data structure pattern.

5. The method of claim 1, wherein automatically generating said transformation document further comprises:
selecting a non-matching data structure pattern that occurs in said first document that does not match any data structure pattern that occurs in said second document; and
inserting an action-needed template into said transformation document, said action-needed template being invoked when said non-matching data structure pattern is encountered during processing of said transformation document, said action-needed template comprising an indication that one or more actions needs to be specified for said action-needed template.

6. The method of claim 1, wherein determining whether said first document comprises a matching data structure pattern that matches said particular data structure pattern comprises:
determining a synonymous data structure pattern that is synonymous with said particular data structure pattern; and
determining whether said first document comprises a matching data structure pattern that matches said synonymous data structure pattern.

7. The method of claim 6, wherein determining said synonymous data structure pattern comprises:
accessing a set of information that indicates that said particular data structure pattern is synonymous with said synonymous data structure pattern.

8. The method of claim 7, wherein said set of information is provided by a user.

9. The method of claim 1, wherein automatically generating said transformation document further comprises:
determining whether any data structure pattern occurring in said first document is identical to a data structure pattern occurring in said second document
in response to a determination that a particular data structure pattern occurring in said first document is identical to a data structure pattern occurring in said second document, inserting a template into said transformation document, said template comprising a copy action, said template being invoked when said particular data structure pattern is encountered during processing of said transformation document, and when invoked, causes said particular data structure pattern to be copied into said result document.

10. The method of claim 1,
wherein analyzing said first document comprises:
compiling a first list of data structure patterns that occur in said first document; and
wherein analyzing said second document comprises:
compiling a second list of data structure patterns that occur in said second document.

11. The method of claim 1, further comprising:
processing said transformation document in conjunction with a third document to derive a transformed document, wherein said third document is a different document from said first document.

12. The method of claim 11, wherein said first document is of a particular type, and wherein said third document is of the same particular type.

13. A computer readable storage medium comprising instructions which, when executed by one or more processors, cause the one or more processors to generate a transformation document, said computer readable medium comprising:
instructions for causing one or more processors to analyze a first document;
instructions for causing one or more processors to analyze a second document, wherein said second document comprises a plurality of data structure patterns; and
instructions for causing one or more processors to automatically generate, based upon said first and second documents, a transformation document which, when processed in conjunction with said first document, gives rise to a result document that comprises a substantial portion of the plurality of data structure patterns in said second document, wherein said instructions for causing one or more processors to automatically generating said transformation document comprise:
instructions for causing one or more processors to select a particular data structure pattern from said plurality of data structure patterns in said second document;
instructions for causing one or more processors to determine whether said first document comprises a matching data structure pattern that matches said particular data structure pattern;
instructions for causing one or more processors to insert, in response to a determination that said first document comprises said matching data structure pattern, a template comprising one or more actions into said transformation document, said template being invoked when a particular triggering data structure pattern is encountered during processing of said transformation document, and when invoked, causes said particular data structure pattern to be created in said result document; and
instructions for causing one or more processors to insert, in response to a determination that said first document does not comprise said matching data structure pattern, a non-match template comprising one or more actions into said transformation document, said non-match template which indicates to a user that a triggering data structure pattern needs to be specified for said non-match template, said non-match template, if invoked, causing said particular data structure pattern to be created in said result document.

14. The computer readable storage medium of claim 13, wherein said first and second documents are XML (eXtensible Markup Language) documents.

15. The computer readable storage medium of claim 14, wherein said transformation document is an XSLT (eXtensible Stylesheet Language Transformation) document.

16. The computer readable storage medium of claim 13, wherein said particular triggering data structure pattern comprises said matching data structure pattern.

17. The computer readable storage medium of claim 13, wherein the instructions for causing one or more processors to automatically generate said transformation document comprises:
instructions for causing one or more processors to select a non-matching data structure pattern that occurs in said first document that does not match any data structure pattern that occurs in said second document; and
instructions for causing one or more processors to insert an action-needed template into said transformation document, said action-needed template being invoked when said non-matching data structure pattern is encountered during processing of said transformation document, said action-needed template comprising an indication that one or more actions needs to be specified for said action-needed template.

18. The computer readable storage medium of claim 13, wherein the instructions for causing one or more processors to determine whether said first document comprises a matching data structure pattern that matches said particular data structure pattern comprises:
   instructions for causing one or more processors to determine a synonymous data structure pattern that is synonymous with said particular data structure pattern; and
   instructions for causing one or more processors to determine whether said first document comprises a matching data structure pattern that matches said synonymous data structure pattern.

19. The computer readable storage medium of claim 18, wherein the instructions for causing one or more processors to determine said synonymous data structure pattern comprises:
   instructions for causing one or more processors to access a set of information that indicates that said particular data structure pattern is synonymous with said synonymous data structure pattern.

20. The computer readable storage medium of claim 19, wherein said set of information is provided by a user.

21. The computer readable storage medium of claim 13, wherein the instructions for causing one or more processors to automatically generate said transformation document further comprises:
   instructions for causing one or more processors to determine whether any data structure pattern occurring in said first document is identical to a data structure pattern occurring in said second document; and
   instructions for causing one or more processors to insert, in response to a determination that a particular data structure pattern occurring in said first document is identical to a data structure pattern occurring in said second document, a template into said transformation document, said template comprising a copy action, said template being invoked when said particular data structure pattern is encountered during processing of said transformation document, and when invoked, causes said particular data structure pattern to be copied into said result document.

22. The computer readable storage medium of claim 13, wherein the instructions for causing one or more processors to analyze said first document comprises:
   instructions for causing one or more processors to compile a first list of data structure patterns that occur in said first document; and
   wherein the instructions for causing one or more processors to analyze said second document comprises:
   instructions for causing one or more processors to compile a second list of data structure patterns that occur in said second document.

23. The computer readable storage medium of claim 13, further comprising:
   instructions for causing one or more processors to process said transformation document in conjunction with a third document to derive a transformed document, wherein said third document is a different document from said first document.

24. The computer readable storage medium of claim 23, wherein said first document is of a particular type, and wherein said third document is of the same particular type.

* * * * *